UNITED STATES PATENT OFFICE.

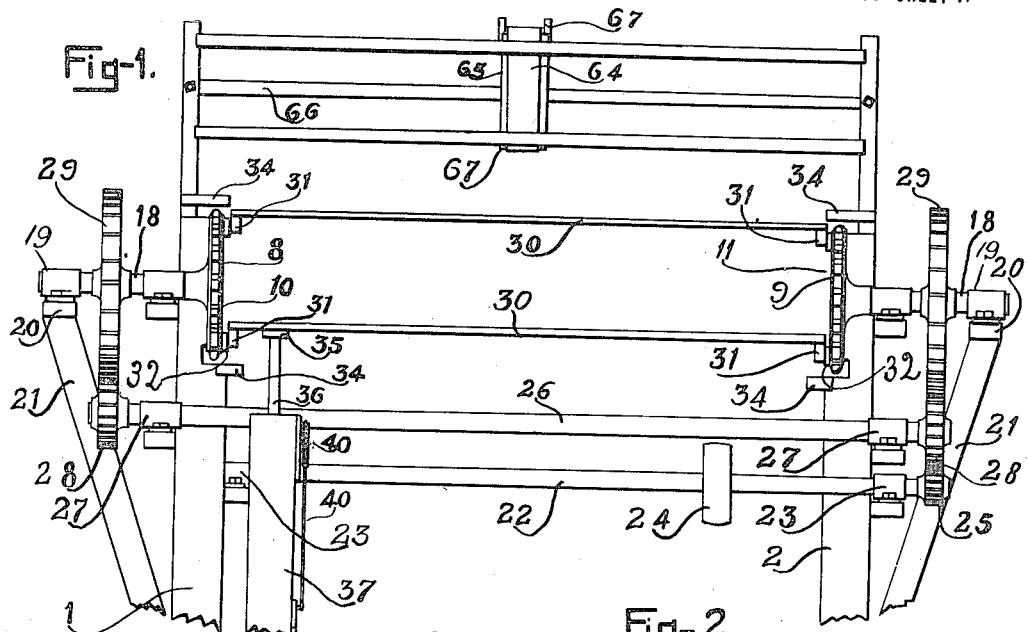

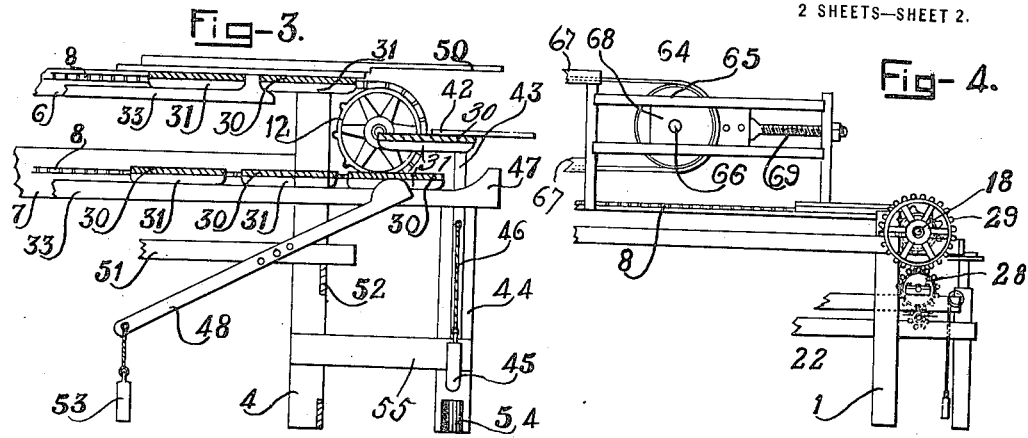
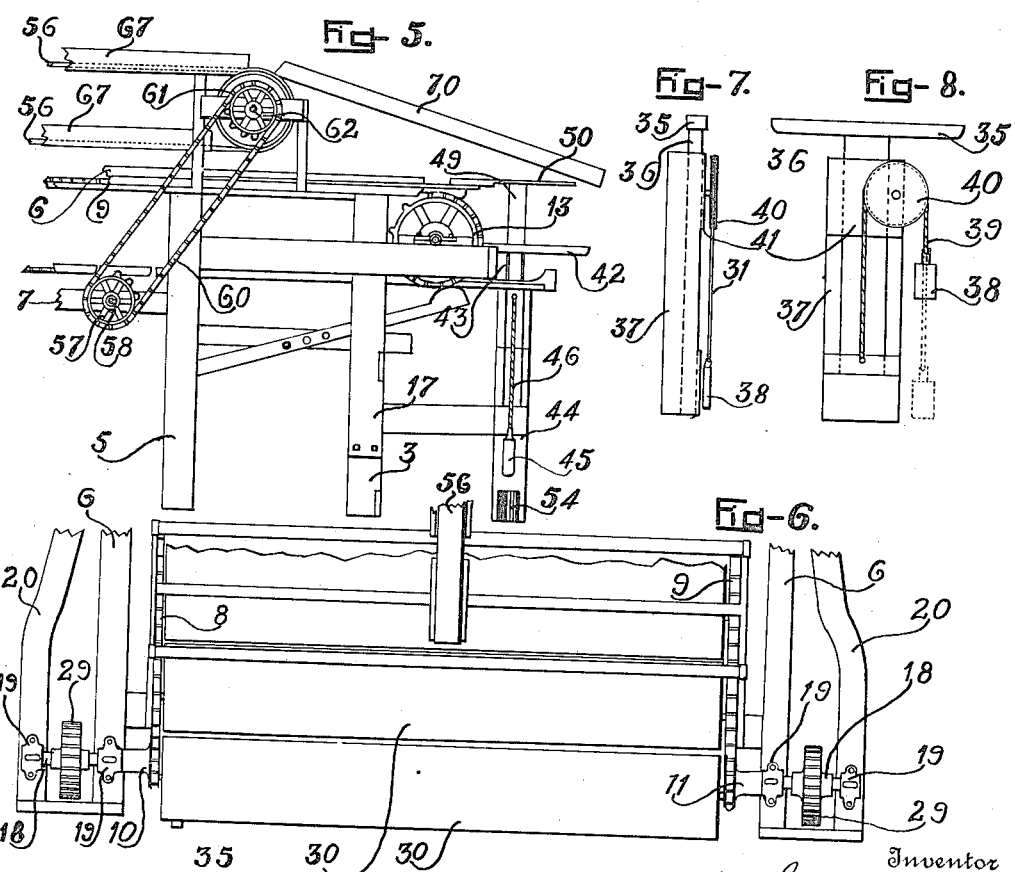

JESSE W. GREER, OF FORT WORTH, TEXAS, ASSIGNOR TO KING CANDY COMPANY, A CORPORATION OF TEXAS.

CANDY-DRYING MACHINE.

1,147,939.  Specification of Letters Patent.  Patented July 27, 1915.

Application filed April 3, 1914. Serial No. 829,250.

*To all whom it may concern:*

Be it known that I, JESSE W. GREER, a citizen of the United States, residing at Fort Worth, in the county of Tarrant and State of Texas, have invented certain new and useful Improvements in Candy-Drying Machines, of which the following is a specification.

My invention relates to drying and packing machines and more particularly to machines for drying and packing chocolate candy, and the object is to provide machines which will save much time and expense in drying candy and by which the drying of the candy will be continuous from start to finish without attention or work on the part of an attendant from the time the candy is placed on the machine until the candy is dry and ready to be moved from the machine. A great advantage is that the curling of the candy is made uniform and the number of times the candy must be handled is greatly reduced.

Other objects and advantages will be fully explained in the following description and the invention will be more particularly pointed out in the claims.

Reference is had to the accompanying drawings which form a part of this application.

Figure 1 is a front elevation of the machine. Fig. 2 is a rear elevation of the same. Fig. 3 is a broken sectional view, being a vertical section showing the interior elevation at the rear end of the machine, one tray with its runner bars being omitted for clearness in illustration. Fig. 4 is a side elevation of the front end of the machine on a reduced scale. Fig. 5 is a side elevation of the rear end of the machine, being the exterior of the machine as shown in Fig. 3. Fig. 6 is a plan view of the front end of the machine. Fig. 7 is a detail view, being an edge view of the moving guide for the candy plates or boards. Fig. 8 is a side elevation of the same.

Similar characters of reference are used to indicate the same parts throughout the several views.

The machine herein described is of such great length that it is impractical to try to show a side elevation or a plan view of the entire machine. The machine may be twenty-five to fifty feet or more in length. The machine is provided with upright posts 1 and 2 at the front end and posts 3 and 4 at the rear end, and any suitable number of posts along the sides of the machine. The machine is provided with upper side beams 6 and lower side beams 7 running from end to end of the machine on both sides of the machine. A pair of endless sprocket-chains 8 and 9 are driven by sprocket wheels 10 and 11 at the front end and wheels 12 and 13, at the rear end of the machine, are driven by the sprocket chains, the sprocket wheels 12 and 13 being idlers for supporting the sprocket chains. The wheels 12 and 13 are provided with shafts 14 which are journaled in bearings 15 which are attached to bars 16 which are provided with braces 17. Sprocket wheels 10 and 11 are provided with shafts 18 which are journaled in bearings 19 which are attached to supporting bars 20 with braces 21. The sprocket wheels and chains are driven by gearing at the front end of the machine. A shaft 22 is journaled in bearings 23 which are attached to the posts 1 and 2. A power pulley 24 is rigid with shaft 22 and may be driven by any suitable power. A pinion 25 is rigid with shaft 22. A shaft 26 is journaled in bearings 27 which are attached to the posts 1 and 2. Pinions 28 are rigid with shaft 26 and one of these pinions meshes with pinion 25 by which the pinions 28 and shaft 26 are driven. Cog wheels 29 are rigid with the sprocket wheel shafts 18 and mesh with the pinions 28 and are driven thereby. The gearing thus described serves to drive the sprocket chains 8 and 9.

The sprocket chains 8 and 9 serve to carry plates or trays 30 which are adapted to carry the candy which is spread thereon. The plates 30 are provided with slides or runners 31 which run on tracks 33 which are attached to the side frame beams 6 and 7 and extend from one end of the machine to the other. The runners 31 are attached at their middle points to the sprocket chains 8 and 9 by means of clips or small plates 32 which are rigid with the runners and pivotally connected to the sprocket chains. Being thus pivotally connected to the sprocket chains, the plates or boards 30 move with the sprocket chains. Guards 34 are provided to prevent upward displacement of the plates 30. Means are provided at the front of the machine for maintaining the plates in horizontal position while the plates are being moved from the upper plane to the lower plane of the sprocket chains. The plates remain pivotally connected to the chains all the time. Just as a plate 30 comes back to the front of the machine and is ready to start to the lower plane, a guard 35 which is carried by a stem or support 36 is thrown up just high enough for a plate to rest on top of the guide or guard. A post 37 has a groove therein for the vertical movement of the support 36. A weight 38 is used to elevate the guard 35. A cord 39 is attached to the support 36 and run up over an idle pulley 40 and then attached to the weight 38. A board 41 is attached to the post 37 to prevent removal of the support 36. When a plate 30 comes on top of the guard 35, the plate 30, being driven by the sprocket chains, forces the guard 35 on down, the guard holding the plate in horizontal position and when the plate 30 reaches the lower plane of the sprocket chain, it moves on off the guard 35, and as soon as the plate passes off of the guard 35, the guard is thrown by the weight 38 back upwardly to receive another plate 30. This operation goes on continuously and automatically while the machine is running.

At the rear end of the machine, provision is made for holding the plates 30 horizontal while changing from the lower plane of the sprocket chain to the upper plane of the sprocket chain. A guard 42 is located just above the plane of the lower sprocket chains. The guard is carried by a support 43 which moves vertically in a groove in a post 44. A weight 45 is connected to the support 43 by a cord 46. A plate will pass under the guard 42 and the guard 42 will rest on top of the plate and the sprocket chains will move the plate upwardly and force the guard upwardly. The chain will move on and from under the guard 42 and the weight 38 will draw the guard down in time to catch on top of the next following plate 30. This operation goes on continuously while the machine is running. Devices are necessary in starting the plate 30 upwardly in horizontal position. The track 33 is curved at 47 to start the front edge of the plate 30 upwardly and a weighted lever 48 presses under the rear edge of the plate to maintain the plate in horizontal position while the front edge of the plate is riding up the curve at 47. As soon as the plate reaches the guard 42, the guard will hold the plate in horizontal position while the plate is passing around the sprocket wheel 12. A guard 50 is mounted above the highest point to which the guard 42 reaches to prevent displacement of the guard 42. The guard 50 is supported on an upright 43. The lever 48 is fulcrumed on a bar 51 which rests on the cross-brace 52. A weight 53 is suspended from the lever 48 to pull down on the lever for pressing upwardly against the plates 30 as they pass over the end of the lever. A socket 54 is prepared to receive the weight 45. The post 44 is braced by a cross bar 55 which is attached to the main frame, and by the track bar 33.

The machine operates automatically when once started and the candy plates are carried from the front end in the lower plane of the sprocket chains and back to the front end in the upper plane of the sprocket chains.

The sprocket chain 9 operates a package carrier belt 56. A sprocket wheel 57 is mounted on a shaft 58 which is journaled in the machine frame. This wheel is driven by the sprocket chain 9 by placing another sprocket wheel 59 on the shaft 58 in line with the chain 9 so that the chain 9 will engage the wheel 59. The wheel 57 drives a chain 60 and chain 60 drives a sprocket wheel 61 which is mounted on and rigid with the shaft 62. A pulley 63 is rigid with the shaft 62 and drives a belt 64. An idle pulley 65 is mounted on a shaft 66 at the front end of the machine. Guards 67 are provided for the carrier belt 64. The shaft 66 is journaled in sliding bearings 68. Screw bolts 69 are swivelly connected to the bearings 68 for the purpose of regulating the tension of the belt 64. The belt 64 will discharge packages down a chute 70. This provision is necessary to take the packages from the front end of the machine to store them at the rear end of the machine for delivery.

In operation, the trays are loaded or the candy spread thereon at the front of the machine. A card board or suitable paper or other covering may be placed on the trays to receive the candy which is placed thereon piece by piece. The candy is carried on the lower plane of the sprocket carrying chains to the rear of the machine and then back toward the front of the machine on the upper plane of the sprocket chains. When the candy is approaching the front of the machine on the return trip, it may be removed by the attendants and packed in suitable boxes or other receptacles. The candy can be taken more than one trip on the machine if necessary. At or near the front of the machine, the candy is packed in boxes which are being brought along on the lower part of the carrier belt 56. The empty boxes are placed on the lower part of the carrier belt toward the rear of the machine and moved along so that the attendants can use them as needed. When the boxes are packed they are placed on the upper part of the carrier belt and delivered toward the rear of the machine and they slide down the chute 70 off of the machine.

It is apparent that various changes may be made in the construction of the machine without departing from my invention. The drying and packing of the candy are made uniform. The temperature is maintained at a constant degree and the exposure of the candy while making the trip about the machine cures the candy in a most satisfactory manner.

What I claim, is,—

1. A candy drying and packing machine comprising a horizontal frame, a pair of sprocket wheels mounted on each end of said frame, a pair of sprocket chains running on said wheels in upper and lower planes, trays provided with runners pivotally connected to said chains, tracks attached to said frame for causing said chains and trays to run in horizontal planes and for causing said trays to remain in horizontal position during their travel, a vertically movable guard at the rear end of the machine for holding each tray in horizontal position while changing from the lower to the upper plane, and a weight for restoring the guard to its normal position after the passage of a tray.

2. A candy drying and packing machine comprising a horizontal frame, a pair of sprocket wheels mounted on each end of said frame, means for driving one pair of said wheels, a pair of sprocket chains running on said wheels in upper and lower planes, trays provided with runner bars pivotally connected at their middle points to said chains, tracks for said runner bars connected to said frame for holding said trays in horizontal positions, vertically movable means at the rear end of the machine for maintaining said trays in horizontal position while changing from the lower to the upper plane, and vertically movable means at the front end of the machine for maintaining said trays in horizontal position while changing from the upper plane to the lower plane.

3. A candy drying and packing machine comprising a horizontal frame, a pair of sprocket wheels mounted at each end of the machine, a pair of sprocket chains running on said wheels in upper and lower planes, trays spanning the spaces between said chains and provided with runner bars pivotally connected thereto, means for maintaining said trays in horizontal positions between the ends of said machine, and guards vertically movable by said chains at the ends of the machine for maintaining said trays in horizontal positions while being moved from one plane to the other by said sprocket chains and weights for restoring the guards to their normal positions.

4. A candy drying and packing machine comprising a horizontal frame, a pair of sprocket wheels mounted at each end of said frame, a pair of sprocket chains running on said wheels, trays spanning the spaces between said chains, runner bars attached to said trays and means pivotally connecting the central portions of said runner bars to said chains, and vertically-movable weight-controlled means for maintaining said runner bars in horizontal positions during the movement about said machine whereby said runners maintain said trays in horizontal positions.

5. A candy drying and packing machine comprising a horizontal frame, a pair of sprocket wheels mounted at each end of said frame, a pair of sprocket chains running on said wheels in upper and lower planes, trays spanning the space between said chains and provided with runner bars pivotally connected to said chains, a guard at the rear end of said machine movable by said chains and adapted to engage said runner bars and hold the same in horizontal position while being forced by said chains from the lower plane to the upper plane, and means for replacing the guard after it guides each tray to the upper plane.

6. A candy drying and packing machine comprising a horizontal frame, a pair of sprocket chains operatively connected with said frame and running in upper and lower planes, trays spanning the space between said chains and provided with runner bars pivotally connected at their middle points to said chains, means for maintaining said trays in horizontal positions intermediate the ends of said frame, and guards horizontally disposed and vertically movable by said chains at the ends of said frame maintaining the trays in horizontal position while being moved from one plane to another by said chains.

7. A candy drying and packing machine comprising a horizontal frame, a pair of sprocket chains operatively connected with said frame and running in upper and lower planes, trays spanning the space between said chains and provided with runner bars pivotally connected at their middle points to said chains, means intermediate the ends of said frame for maintaining said runner bars and trays in horizontal positions, means at the ends of the frame for maintaining the trays in horizontal positions while being moved by the chains from one plane to another, and a weighted lever at the rear end of the frame for balancing each tray as it starts from the lower plane to the upper plane.

8. A candy drying and packing machine comprising a horizontal frame, a pair of sprocket chains operatively connected with said frame and running in upper and lower planes, trays spanning the space between said chains and provided with runners pivotally connected at their middle points with said chains, means intermediate the ends of the frame for maintaining said trays in horizontal positions, and a vertically movable guard at the front end of the frame movable by said chains for holding each tray in horizontal position while it passes from the upper plane to the lower plane and a weight for elevating said guard to normal position after the passage of each tray.

In testimony whereof, I set my hand in the presence of two witnesses, this 13th day of March, 1914.

JESSE W. GREER.

Witnesses:
 A. L. JACKSON,
 OLIN DAVIS.

Copies of this patent may be obtained for five cents each, by addressing the "Commissioner of Patents, Washington, D. C."